No. 833,454. PATENTED OCT. 16, 1906.
C. F. FLEMMING.
CHOCK FOR TRANSPORTING VEHICLES ON RAILWAY CARS.
APPLICATION FILED MAR. 5, 1906.

Witnesses
Edwin L. Jewell
Edw. S. Duvall Jr.

Inventor
Charles F. Flemming
By Chas E. Riordan
His Attorney

UNITED STATES PATENT OFFICE.

CHARLES F. FLEMMING, OF WASHINGTON, DISTRICT OF COLUMBIA.

CHOCK FOR TRANSPORTING VEHICLES ON RAILWAY-CARS.

No. 833,454.

Specification of Letters Patent.

Patented Oct. 16, 1906.

Application filed March 5, 1906. Serial No. 304,313.

*To all whom it may concern:*

Be it known that I, CHARLES F. FLEMMING, a citizen of the United States, residing at Washington, District of Columbia, have invented certain new and useful Improvements in Chocks for Transporting Vehicles on Railway-Cars, of which the following is a full, clear, and exact specification.

This invention relates to chocks to be detachably secured to the platforms or floorings of cars or other conveyances used in transporting vehicles.

Since the advent of motor-vehicles, many of them fitted with pneumatic tires liable to puncture or injury from abrasion, the transportation companies have found that the safe carriage of such vehicles involves difficulties not heretofore encountered, these difficulties in transportation arising from the weight and comparative delicacy of the modern motor-vehicle, great difficulty having been found in securing said vehicles on a car-platform in such manner as to receive no injury from the shocks incident to railway transportation and so it does no injury to the car.

The main object of my invention is a chock, or, more properly, a set of chocks for the wheels of such vehicles, said chocks being detachably secured to the flooring of the car, whereby the wheels of the vehicle are held against shifting in any direction.

With this other objects in view the invention consists in novel features and combinations to be hereinafter described and claimed.

Figure 1:
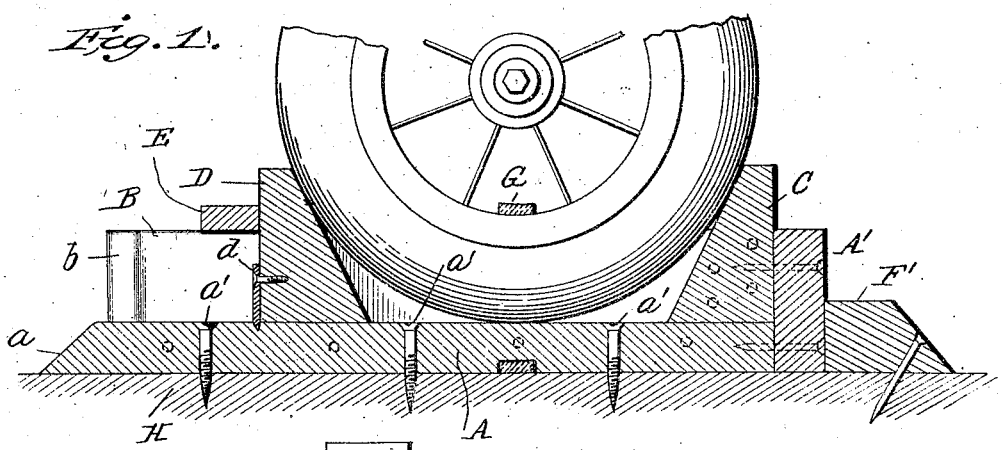
Figure 2:
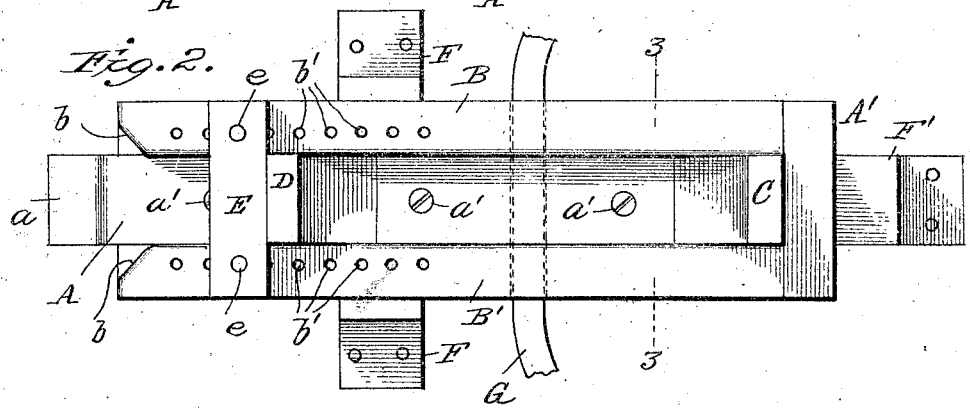
Figure 3:
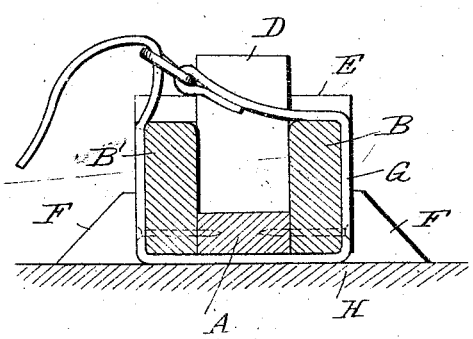
Figure 4:
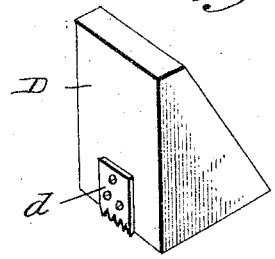

In the accompanying drawings, wherein similar letters of reference are used to indicate corresponding parts in each of the several views, Figure 1 is a vertical longitudinal section through one of a set of chocks embodying my invention, the lower part of a wheel being shown therein to illustrate its application. Fig. 2 is a top plan view of one of the chocks. Fig. 3 is a transverse section on the line 3 3 of Fig. 2, and Fig. 4 is a detail perspective view of the removable end block of the chock.

In practice four of the chocks illustrated will be used as a set, one for each wheel of the vehicle; but as the members of a set are identical in construction a description of one will suffice.

The individual chocks of a set each comprise a base A, side rails B B' a fixed end block C, an adjustable end block D, an adjusting-rail E, and anchors F and F', these parts being proportioned to each other and to the size of the wheels to be secured therein. The base is constructed of a length of stout planking, beveled or chamfered at one end, as at $a$, and provided at suitable points throughout its length with apertures $a'$ for the reception of screws $a^2$, by which the chock may be secured to the floor H of a car. To the edges of the base are permanently secured the side rails B B', terminating at one end flush with the end of the base. To the flush ends of the base and side rails is permanently secured rail A', which closes this end of the trough-like structure, and firmly secured between and to the sides and to the bottom and end rail is the end block C, that shown having the form of a truncated right-angled triangle, the oblique side facing the opposite end of the chock. The side rails B and B' at the other end (which I shall term the "open" end) of the chock terminate slightly in rear of the top of the beveled surface $a$ of the base and are correspondingly beveled, as at $b$.

The removable and adjustable end block D corresponds in form with the fixed end block C, already described, and is provided at the lower end of its vertical face with a steel plate $d$, the lower end of which projects slightly below the base of the block and is serrated to engage the upper surface of the base A.

The side rails B and B' are provided on their top edges near the open end of the chock with vertical apertures $b'$ to receive the stout pins $e$, projecting downward from the opposite ends of the adjusting-rail E.

The base A is provided in the under side at about midway of its length with a transverse recess or groove (shown in Fig. 1) to receive a stout strap G, designed to be buckled over the felly of a wheel when the latter is in position in the chock, and thus prevent the wheel from rising from the base A and securely holding it steadily therein.

To provide against dislodgment of the chock under heavy strains or shocks—as, for instance, when used with a three-ton machine—I provide side anchors F F and an end anchor F', which are to be secured to the car-flooring when needed to brace and support the chock against lateral and longitudinal strains.

While the chocks herein illustrated and described have heretofore been constructed of wood, I contemplate forming them of cast metal, in which case the base A, sides B B, and fixed end block C would be cast integral.

In use two chocks of a set will be secured parallel to each other and at a distance apart to receive the two front or rear wheels of a vehicle and the adjustable block D and rail E removed. The wheels of the vehicle are now run into the chocks until the tire is snugly seated against the fixed block C, when the adjustable block will be seated in position, with the serrations of plate d securely biting into the upper face of the base, (see Fig. 1,) the adjusting-rail secured to support said block, and the strap G drawn around the felly of the wheel and buckled in position. The desired position of the two remaining chocks of a set are now to be ascertained, when they are also secured to the car-flooring and the remaining wheels of the vehicle lifted into them and secured therein in a similar manner. This operation presumes that the chocks at the opposite ends of a set are placed with their open ends adjacent to or facing each other, so that the fixed blocks C will resist either forward or backward movement of the vehicle; but it will be understood that all the chocks of a set may be placed facing or pointing in the same direction, in which case the four wheel of a vehicle may be run simultaneously into the chocks placed to receive them and then secured in position for shipment.

Having thus fully described my invention, what I claim as new, and desire to secure by Letters Patent of the United States, is—

1. A chock for securing vehicle-wheels upon conveyances for shipment, comprising an elongated base adapted for fastening to a conveyance-flooring, fixed sides and a fixed end block, a removable and adjustable end block, means for supporting the latter in adjusted position, and means for embracing a wheel-felly when positioned in the chock.

2. A chock for securing vehicle-wheels upon conveyances for shipment comprising an elongated base adapted for fastening to a conveyance-flooring, fixed sides and a fixed end block, a removable and adjustable end block, and means for supporting the latter in adjusted position, said base and sides being beveled at the open end.

3. A chock for securing vehicle-wheels upon conveyances for shipment, comprising an elongated base adapted for fastening to a conveyance-flooring, fixed sides and a fixed end block, a removable and adjustable end block, and means for supporting the latter in adjusted position, in combination with anchors adapted for securement to the conveyance-flooring to support the chock against movement.

4. A chock for securing vehicle-wheels upon conveyances for shipment, comprising an elongated base adapted for fastening to a conveyance-flooring, fixed sides and a fixed end block, a removable and adjustable end block, means for supporting the latter in adjusted position, in combination with anchors adapted for securement to the conveyance-flooring to support the chock against movement, and means for embracing a wheel-felly when positioned in the chock.

In testimony whereof I have signed my name to this specification in the presence of two subscribing witnesses.

CHARLES F. FLEMMING.

Witnesses:
  CHAS. E. RIORDON,
  H. P. HOWARD, Jr.